(12) United States Patent
Hong et al.

(10) Patent No.: US 7,228,350 B2
(45) Date of Patent: *Jun. 5, 2007

(54) INTELLIGENT DEMAND DRIVEN RECOGNITION OF URL OBJECTS IN CONNECTION ORIENTED TRANSACTIONS

(75) Inventors: Jack Hong, Cupertino, CA (US); Albert Bonyao Chu, Morgan Hill, CA (US); Vijay Jaswa, Saratoga, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 435 days.

This patent is subject to a terminal disclaimer.

(21) Appl. No.: 09/921,458

(22) Filed: Aug. 3, 2001

(65) Prior Publication Data

US 2002/0048269 A1 Apr. 25, 2002

Related U.S. Application Data

(60) Provisional application No. 60/223,087, filed on Aug. 4, 2000.

(51) Int. Cl.
G06F 15/173 (2006.01)
H04L 12/28 (2006.01)

(52) U.S. Cl. .................. 709/226; 709/238; 370/389
(58) Field of Classification Search ................ 709/203, 709/226, 238; 711/120, 121, 122, 123, 119, 711/118, 154, 124, 144, 147, 163, 168; 370/389
See application file for complete search history.

(56) References Cited

U.S. PATENT DOCUMENTS

| 5,710,883 | A | 1/1998 | Hong et al. | |
| 5,737,536 | A | 4/1998 | Herrmann et al. | |
| 5,764,920 | A | 6/1998 | Cook et al. | |
| 5,825,772 | A | 10/1998 | Dobbins et al. | |
| 5,923,885 | A | 7/1999 | Johnson et al. | |
| 6,108,703 | A | 8/2000 | Leighton et al. | 709/226 |
| 6,134,583 | A * | 10/2000 | Herriot | 709/217 |
| 6,304,973 | B1 | 10/2001 | Williams | |
| 6,330,606 | B1 * | 12/2001 | Logue et al. | 709/226 |
| 6,438,652 | B1 * | 8/2002 | Jordan et al. | 711/120 |
| 6,510,464 | B1 | 1/2003 | Grantges, Jr. et al. | |
| 6,640,239 | B1 | 10/2003 | Gidwani | |

(Continued)

FOREIGN PATENT DOCUMENTS

WO PCT/US 01/24313 3/2001

(Continued)

OTHER PUBLICATIONS

Ross, Keith., "Hash-Routing for Collections of Shared Web Caches," Nov./Dec. 1997 IEEE Network Magazine, pp. 37-44.*

(Continued)

*Primary Examiner*—Nathan J. Flynn
*Assistant Examiner*—Ashok Patel
(74) *Attorney, Agent, or Firm*—Sheridan Ross P.C.

(57) ABSTRACT

The present invention is directed to a network switch that determines when specific content is hot and directs flow to one or more cache servers. The architecture of the present invention can include a cache and a digest generator to store predetermined objects in the cache based on the digest generated by the digest generator.

49 Claims, 8 Drawing Sheets

U.S. PATENT DOCUMENTS

| | | | |
|---|---|---|---|
| 6,664,978 B1 | 12/2003 | Kekic et al. | |
| 6,671,853 B1 | 12/2003 | Burkett et al. | |
| 6,718,387 B1 | 4/2004 | Gupta et al. | |
| 6,748,446 B2 | 6/2004 | Sato et al. | |
| 6,754,699 B2 | 6/2004 | Swildens et al. | |
| 6,763,370 B1* | 7/2004 | Schmeidler et al. | 709/203 |
| 6,772,333 B1 | 8/2004 | Brendel | |
| 6,799,202 B1* | 9/2004 | Hankinson et al. | 709/203 |
| 6,862,624 B2 | 3/2005 | Colby et al. | |
| 2002/0026560 A1* | 2/2002 | Jordan et al. | 709/203 |
| 2002/0040400 A1* | 4/2002 | Masters | 709/226 |
| 2002/0112154 A1* | 8/2002 | Wallace, Jr. | 713/153 |
| 2003/0187871 A1 | 10/2003 | Amano et al. | |
| 2004/0230566 A1* | 11/2004 | Balijepalli et al. | 707/3 |

FOREIGN PATENT DOCUMENTS

| | | |
|---|---|---|
| WO | WO 01/69890 A1 | 9/2001 |
| WO | 02/13479 | 2/2002 |

OTHER PUBLICATIONS

Examiner's Report for Canadian Application No. 2,415,888 dated Mar. 7, 2005, 3 pages.

Cheng Wu, "What is Web Switching? Web Switching: A New Generation of Networking", http://www.arrowpoint.com/switch/what/what.num, 3 pages, Oct. 1, 1999.

Cheng Wu, "What is Web Switching? Web Switching vs. L3/L4 Switching", http://www.arrowpoint.com/switch/what/what.num, 5 pages, Oct. 1, 1999.

Product Matrix, http://www.arrowpoint.com/products/matrix/matrix.num., 2 pages, Oct. 1999.

Alteon Web Systems, Virtual Matrix Architecture Scaling Web Services for Performance and Capacity, Apr. 2000, 13 pages, http://www.alteonwebsystems.com.

Apostolopoulos, G., et al. Design, Implementation and Performance for a Content-Based Switch, IEEE INFOCOM 2000, pp. 1117-1126.

Liebrmann, L. Load Balancing: Where the Action Is, Network Magazine.com, Jan. 3, 2000, 7 pages. http://www.networkmagazine.com/article/NMG20000426S0014.

USPTO, Official Office Action data Jul. 15, 2005, in U.S. Appl. No. 09/921,832, filed Aug. 3, 2001, 22 pages.

Office Action from the U.S Patent and Trademark Office dated Feb.9, 2006, regarding U.S. Appl. No. 09/921,832.

Office Action from U.S. Patent and Trademark Office dated Jul. 29, 2005 regarding U.S. Appl. No. 09/921,460.

Arlitt, Martin F. "Web Server Workload Characterization: The Search for Invariants," SIGMETRICS 1996, pp. 1-12, May 1996.

Cohen, Edith, et al. "Evaluating Server-Assisted Cache Replacement in the Web,", Lecture Notes in Computer Science, vol. 1461, Aug. 1998, pp. 307-319.

Franklin, Michael J. et al. "Transactional Client-Server Cache Consistency: Alternatives and Performance," ACM Transactions on Database Systems, vol. 22, No. 3, Sep. 1997, pp. 315-363.

Kristol et al. "HTTP State Management Mechanism," RFC 2109, Feb. 1997.

Luciani, J. et al. "Server Cache Synchronization Protocol," RFC 2334, Apr. 1998.

Rekhter, Y. et al. "Cisco Systems' Tag Switching Architecture Overview," RFC 2105, Feb. 1997.

Yin, Jian et al. "Hierarchical Cache Consistency in a WAN," 2.sup.nd USENIX Symposium on Internet Technologies and Systems. Aug. 30, 1999, pp. 13-24.

Written Opinion for corresponding International (PCT) Patent Application No. PCT/US01/24313 mailed Jul. 18, 2002.

Corrected International Preliminary Examination Report for corresponding International (PCT) Patent Application No. PCT/US01/24313 mailed Aug. 29, 2003.

Examiners Office Letter for Japanese Patent Application No. 2002-518709 (including translation), mailed Dec. 4, 2005 (Attorney's Ref. No. 4366-40-PJP).

N. Kato, "Server Load Dispersing Device, a dispersion technique or its correspondent protocol is particular and take notice of functions matching with needs", NIKKEI Communications, Mar. 20, 2000, ( CSDB: Domestic Technology Journal 200200232017) (relevence is believed to be described in Examiner's Office Letter for Japanese Patent Application No. 2002-518709 disclosed herewith).

M. Fujikawa, "New Technology in Layer 4th switches - URL switch or Broad region load dispersion - appeared" NIKKEL Communications, Mar. 1, 1999 (CSDB: Domestic Technology Journal 199900729008) (relevence is believed to be described in Examiner's Office Letter For Japanese Patent Application No. 2002-518709 disclosed herewith).

* cited by examiner

INTELLIGENT DEMAND DRIVEN RECOGNITION OF URL OBJECTS IN CONNECTION ORIENTED TRANSACTIONS

CROSS REFERENCE TO RELATED APPLICATIONS

The present application claims the benefits under 35 U.S.C. § 119(e) of U.S. Provisional Application Ser. No. 60/223,087, of the same title, filed Aug. 4, 2000, to Chu, Jaswa, and Chaganty, which is incorporated herein by reference in its entirety. The present application is related to U.S. patent application Ser. No. 09/921,460, now U.S. Pat. No. 7,062,570, entitled "High Performance Server Farm With Tagging and Pipelining" and U.S. patent application Ser. No. 09/921,832 "Non-Intrusive Multiplexed Transaction Persistency in Secure Commerce Environments", both of which are filed concurrently herewith and have the same named inventors as the present application.

FIELD OF THE INVENTION

The present invention relates generally to load balancing, network switches, and particularly to network switches capable of performing intelligent load balancing of flows while maintaining transaction coherency.

BACKGROUND OF THE INVENTION

Businesses are rapidly becoming computer and network dependent. Web technology is adding momentum to E-Commerce deployment by providing user friendly front ends for applications. Continuous access to and instantaneous responses from the hosted services are essential for successful client/server applications. Down times and slow and/or erroneous responses can lead to customer frustration and sales losses. Accordingly, there is an increasing demand for server high availability and performance.

To achieve the levels of server availability, performance, and scalability (in view of the time dependent, dramatic spikes in website usage), a farm of servers or server farm with one or more intelligent Internet protocol or IP switches are typically employed. The IP switch performs load balancing of Internet Protocol or IP traffic across the multiple servers based on information contained in one or more layers of the OSI network model (i.e., Layer 7 or the Application Layer, Layer 6 or the Presentation Layer, Layer 5 or the Session Layer, Layer 4 or the Transport Layer, Layer 3 or the Network Layer, Layer 2 or the Data Link Layer, and finally Layer 1 or the Physical Layer). The group of servers is typically identified by a single global IP address. Traffic destined for the global IP address is load balanced across the serves within that group based on the workload of the servers with source IP address and selected server address affinity. All clients accessing the servers see only the global IP address and are indifferent to the number of replicated servers within the farm and to which specific server their traffic is being forwarded.

A number of different types of IP switches are in use.

One type of switch, including Layer 3 and/or Layer 4 switches, route incoming packets based on the destination IP address or the combination of IP address, protocol ID, and transport port number. This switching technique can be problematic in a Web environment. To a Layer 4 load balancer, all of the Web applications appear to be using TCP port 80 (typical port for HTTP), making them indistinguishable from one another. Accordingly, a Common Gateway Interface or CGI request looks no different from a Web-enabled Service Access Point or SAP application or streaming audio request, even though all of these requests have very different Quality of Services (QoS) requirements.

Another type of IP switch is known as a Web switch, which is a new generation of networking specifically designed to address the unique requirements of Web traffic. Web switches are "smart"—armed with sophisticated Universal Resource Locator or URL load balancing capabilities, Network Address Translation or NAT, and embedded Domain Name Server or DNS intelligence, and use complex policies to manage and speed Web traffic flows. Web switches are able to optimize Web traffic because they look into the HTTP payload down to the URL and cookie to determine what content is being requested. As used herein, a "cookie" refers to information stored on a client or peer at the request of a server. Cookies typically include a description of the path range of URLs for which that cookie is valid and are appended or tagged to a server response. The information in the cookie is, of course, defined by the server. As will be appreciated, URLs identify only the content requested and do not dictate where the content should be found. With the knowledge of the content requested, the Web switch employs user-defined and/or pre-set policies to determine which flow security rules are enforced, which content is allowed or denied, and which QoS requirements are needed for specific content or users. This provides flexibility in defining policies for traffic prioritization—enabling tiered services and compliance with Service Level Agreements—and the ability to use sticky connections and user authentication, which are critical requirements for E-commerce.

Web switches use a highly-scalable multiprocessor framework that evaluates policy only at flow (session) set up. Once a flow is set up, all subsequent packets within that flow are cut-through at wire speed via high speed forwarding circuitry on a per port basis. This approach of "flow set up once, switch all other packets" enables the complex classification of traffic at the URL level while achieving the price/performance of Local Area Network or LAN switches.

The web switch determines which Web server or cache is best able to handle the specific request at that moment based on criteria such as proximity of the user to a server, the server's condition, the condition of the network path, and which content has been requested. Web switches intercept all traffic destined for a Web site. This permits the switches to track content requests and to predict hot content before a server becomes overwhelmed. Web switches dynamically replicate hot content to a Web cache and bring the cache into the load balancing rotation, ensuring a continually positive user experience, despite wide fluctuations in Web site traffic. Web switches also track which servers have delivered specific content and send new requests for that content directly to the appropriate server, resulting in improved server cache coherency and performance.

Web switches, however, have problems. For example, Web switches also require excessive amounts of computational resources and otherwise suffer from computational inefficiencies.

SUMMARY OF THE INVENTION

These and other needs are addressed by the architectures and methods of the present invention.

In one embodiment, the invention provides a network flow switch that is coupleable between a communications network and a data server farm. In one configuration, the network flow switch is configured as a Layer 2, 3, and 4 Web switch and assumes the global IP addresses of a server farm and receives all transaction requests from clients on behalf of the server farm. A "transaction request" refers to any signal, whether or not in the form of a packet, that requests or otherwise initiates work by one or more servers, such as causing the server(s) to provide requested information stored in the memory of the server(s) or to compute information based on information referenced or provided by the signal. The network flow switch includes a routing component that operates on a received data packet to determine the source and destination-related invariants within the IP data packet. These invariants then are used as the basis for determining a destination device for the IP packet.

In one configuration, the switch inspects any combination of URL and content type to route requests and set access priority; parses to determine the requested URL; selects the best able server to retrieve the content; and thereby builds a URL database of source server with reference count (or hit counter) and expiration timer (or time stamp). Repeated requests are directed to the same server, which may be a cacheable server. Using content reference count and the expiration timer, the switch can calculate the combination of access frequency and recency and thereby detect the "hot" content. Frequently requested content is thereby efficiently segregated and cached even among a cluster configuration of network flow switches. An optional server-side cache processor can also be coupled to the switch component. This cache processor includes a local object cache, for storing frequently requested data objects, and a digest store containing digests corresponding to the URLs of the objects stored by the local object cache. Where multiple network flow switches are clustered, the contents of the distributed digest stores are shared within the cluster. Object look-ups are thus comprehensive and additionally identify the likely local object cache that contains the referenced object.

In one configuration, the cache digest is a pointer that points to a memory location of the frequently requested data objects in the cache. Typically, the digest is based at least in part on a URL and is a bit vector with sparsely populated ones. The dimension of the vector is the capacity of the collection of cache digests, which is set as the number of objects in the cache multiplied by the cache digest dimension. The cache digest dimension is the number of hash functions or hash components associated with a URL digest. The value of hash components for that key represents indices into the vector with only the corresponding bits set to one. The collection of all cache digests is the bit vector by logically OR of digest vectors of all cached objects.

The architecture and methods of the present invention can have a number of advantages compared to the prior art.

First, the switch can provide significant computational and memory savings relative to other types of network switches. Conventional flow switches using a cache typically maintain a table of objects corresponding to signals processed by the switch. The switch searches through the table from top to bottom or from bottom to top each time a switching decision is to be made to locate a pointer associated with the object. Depending upon which end of the table is first searched, the objects at the top or bottom of the table have short search times while objects at the other end of the table have relatively long search times. Substantial computational resources are consumed for each switching decision, thereby limiting switch capacity. Additionally, substantial memory space is required to accommodate the table, causing objects to be periodically flushed from the table before the useful life of the object has expired. The methodology of the present invention does not have to search through a table each time a switching decision is made as the digest value points the processor directly to the location of the object being searched for.

Second, the switch, when compared to Port 80 traffic redirecting switches, can reduce storage and computing resources required by the cache server cluster (i.e., an interconnected network of cache servers that act as a single repository of cached pages) while maintaining the same rate of bandwidth savings. A "cache server" interrupts the transaction requests intended for origin servers and serves them from its storage) while an "origin server" is the server for which a selected transaction request was originally intended or originated from (e.g., the server identified by the packet cookie). Port 80 switches must terminate all connections at the cache servers regardless of whether there is a cache hit or miss and caches all pages including ones from origin servers that will not be accessed again for long periods of time. The switch can address these two problems by providing wire speed switching for cache hits, wire speed switching for the majority of cache misses, and identification of hot URLs and origin HTTP servers to increase the cache hit rates of the cache servers.

Third, the switch can serve as a reverse proxy for the server farm by intercepting and accepting all connection requests from clients on behalf of the server farm.

Fourth, when the HTTP and HTTPS requests and responses pass through the reverse proxy, the switch can parse server-generated cookies to deliver seamless processing to user requests.

Fifth, the switch can, on incoming traffic flows, perform flow filtering, classification, traffic pattern learning, and priority shaping.

Sixth, the switch can be strategically placed to intercept all the HTTP traffic from browsers, direct them to HTTP cache servers and thus deliver faster responses and provide better Web surfing experiences to clients.

Finally, a cluster of switches can be employed as the switches are highly scalable. Digest information and/or tagging information is shared by the various switches in the cluster. This sharing provides not only redundancy but also scalability.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Components of the Network Switch

Figure 1:
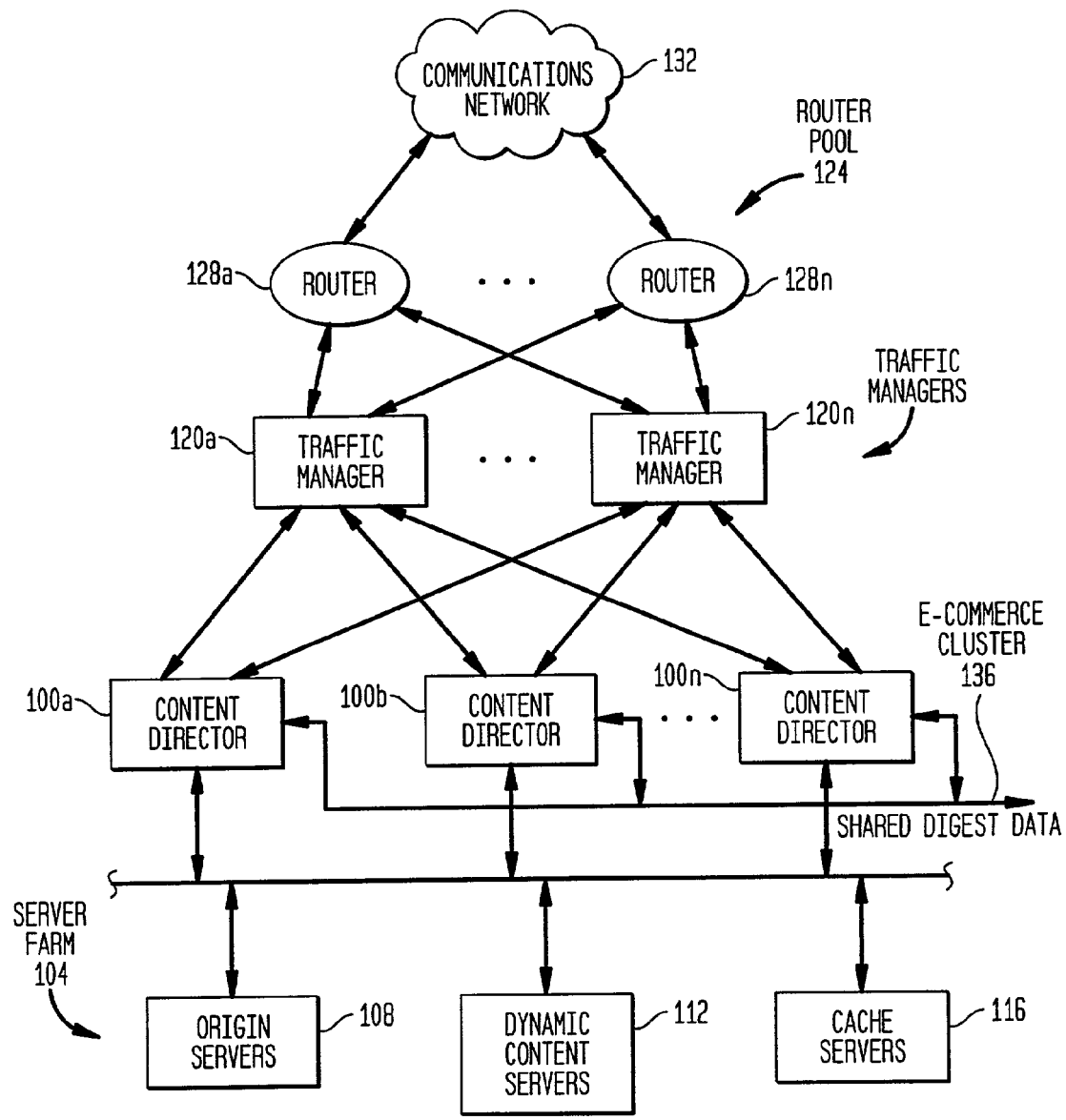
FIG. 1 is a block diagram of a server farm using the flow switch of an embodiment of the present invention.

The present invention is preferably embodied as a server computer system identified as a content director server in FIG. 1. Multiple content director servers 100*a–n* are grouped together as a cluster to support, in a preferred embodiment, e-commerce-type HTTP transactions. A server farm 104 includes origin server(s) 108, dynamic content server(s) 112 and/or cache server(s) 116. Traffic managers 120*a–n* perform load balancing by known techniques across the cluster of content directors. A router pool 124 including routers 128*a–n* route packets from the communications network 132 to the traffic managers 120*a–n*.

Figure 2:
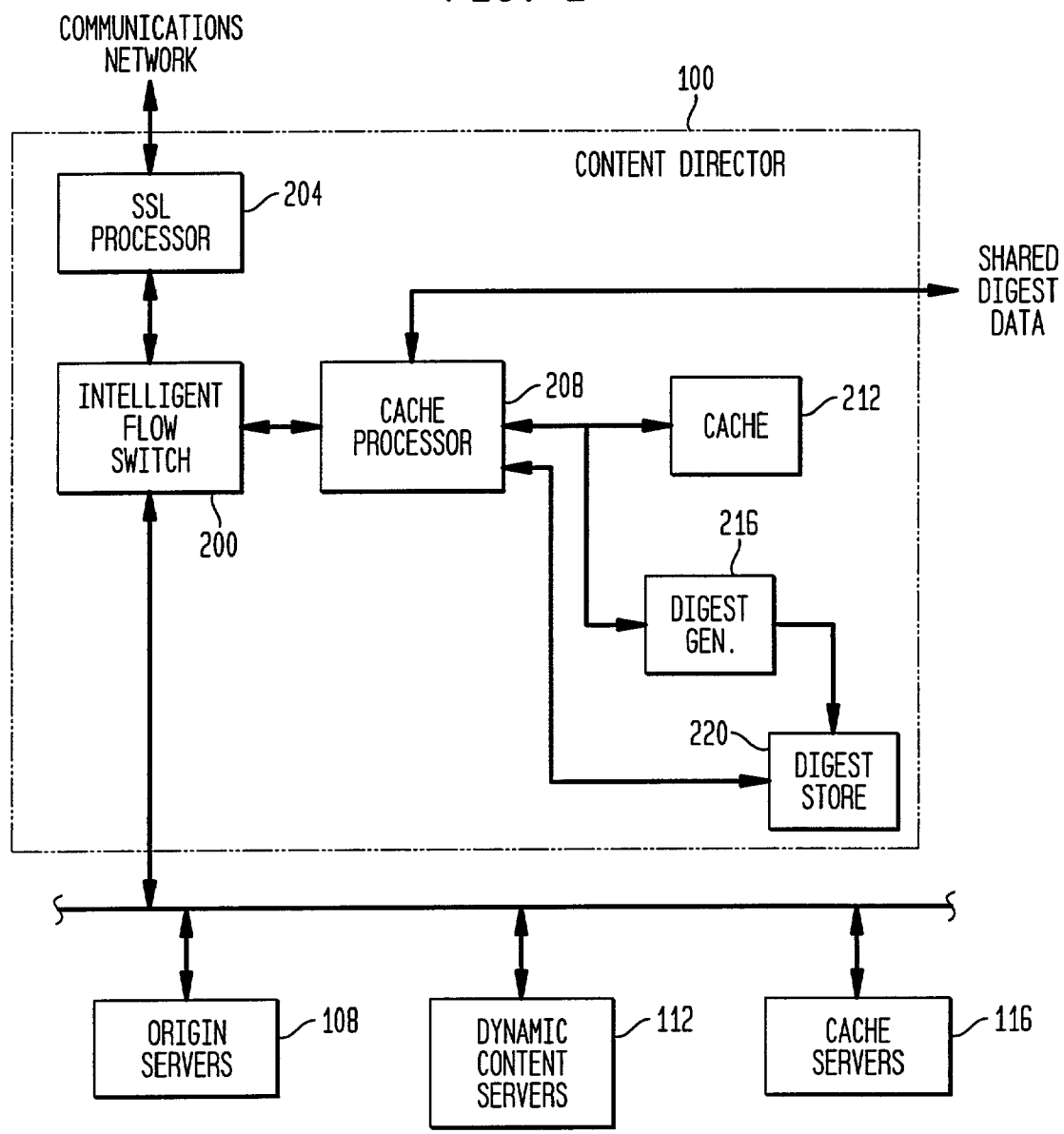
FIG. 2 is a block diagram showing the components of a content director according to an embodiment of the present invention.

Each content director server, as generally shown in FIG. 2, includes an intelligent flow switch 200 for efficiently routing HTTP transactions based on invariants in and associated with IP data packets. An decryption or SSL processor 204 is optionally provided to off-load encryption and decryption operations involved in both secure session negotiation and actual computations. A cache processor 208 is also optionally provided to cache in cache 212 frequently requested, or "hot" content. URL digests are generated by digest generator 216 and stored to a local digest store 220 as well as replicated, directly or indirectly, to other network flow switches in the common cluster.

The content director 100, in the process of redirecting HTTP traffic, learns the traffic pattern of HTTP requests, by monitoring the URL identifiers requested by the client browsers (not shown). When a tunable threshold is exceeded (the hot URL threshold), all HTTP request flows of traffic intended for the newly found hot (origin) server are redirected to the cache servers 116. A "flow" refers to all transactions between a client and a server or between two peers in a connection session. At the same time, requests for infrequently accessed URLs are switched directly to the origin servers 118 without cache server 116 intervention. In one operational mode, the content director intercepts all HTTP traffic transparently and redirects it to cache servers 116 without special protocols or packet tags. The cache servers 116 make spoofed connections with clients (not shown). Content directors also load balance the HTTP traffic to the members of the cache server cluster using known techniques, such as a round robin or a number-of-connections-served basis.

The content director 100 switches non-HTTP traffic to its original destination, and, initially, all HTTP flows to their respective origin server 108. The requested URLs are snooped on the wire by the content director to build up a hot URL database of the traffic pattern. Message digests of URL identifiers are stored in the hot URL database or table in cache 212. As flows to some servers become hot (i.e., the number of requests for an object in a server received in a predetermined period of time meets or exceeds the hot URL threshold), that server's IP address is entered into the hot IP database and new connections to that hot web server are then redirected by the content director to the HTTP cache servers 116. The redirected or switched flow is referred to as a switched flow while an unswitched flow to an origin server is referred to as forwarded flow.

The content director 100 maintains outstanding flows to the same origin server 108 before redirection and allows the flows to complete without interruption. All virtual circuits of HTTP connections are maintained between the browser (or its proxy) (not shown) and the origin server (or its proxy 108), between the browser (not shown) and the HTTP transparent cache server 112, and between the HTTP cache server 112 and the origin server 108. As used herein, a "virtual circuit" is an established TCP/IP connection between two endpoints.

When the traffic pattern to the hot server cools down, its IP address will age out from the hot IP or URL database in cache 212 and traffic to that server reverts back to its normal flow. The various components of the content director are discussed in more detail below.

The SSL Processor

The SSL processor 204 performs authentication and security association; participates in negotiating the cipher algorithm and establishing master secret calculates session keys and assigns session-ID; handles the HTTPS messages in ciphered text and relays them to HTTP servers serving transaction requests in clear text; and caches the session context with session-ID for re-connections. As will be appreciated, the initial SSL handshake deals with the selection of a cipher, the exchange of a master key, and the authentication of the server. After the handshake stage is complete, the client and server agree on the cipher algorithm, master secret to derive session keys for message encryption, and a session-ID assigned by the server to identify the agreed context. As will be appreciated, the SSL processor typically terminates an unsecured session with a client as a prerequisite to initiating a secured session with the client.

The SSL session-ID is the common thread of multiple SSL sessions. In SSLv3, the session ID is transported over a TCP connection in clear or plain text in the second and thereafter connections. In SSLv2, the first time when the SSL server returns the session-ID in the initial handshake, the session-ID is encrypted. To find out the session-ID, the processor has to participate in the establishing of secure context. By offloading the cryptographic processing from servers, the resources of cryptographic acceleration can be better utilized by all servers in the farm 104.

As noted, the SSL processor 204 caches session context session-ID, security association, and virtual host information for re-connections. Entries in the cache (not shown) of the SSL processor are typically indexed by session-ID.

The SSL processor can be any conventional hardware/ software for performing authentication and/or encryption/ decryption. As will be appreciated, security protocols other than SSL can be used between the client and server, depending upon the application, e.g., Virtual Privacy Networks ("VPNs") (or IPsec).

The Intelligent Flow Switch

The intelligent flow switch or IFS 200 (also referred to as the switch component) selects one of the servers in the server farm 104 based on a packet's payload, such as an embedded invariant, forwards requests to the selected server, receives the responses from the server and returns them back to the client. When the request and response messages pass through the IFS, the IFS parses server-generated invariant or secure session invariant to deliver seamless processing of client requests to the selected server in the farm in a persistent manner. The IFS parses all the HTTP responses for server-generated cookie and HTTP requests for user returned cookies. The IFS binds all of the transactions threaded by the same cookie to the server that generated the cookie invariant. By sharing the knowledge of the invariant associations among multiple content directors 100 and off-loading the CPU-intensive encryption computations to distributed processing, the IFS can also increase the overall fault tolerance and performance of the server farm and provide an incremental growth by demand for e-commerce infrastructure.

The IFS memory maintains in memory a number of data objects to facilitate IFS operation. For example, the IFS maintains optionally a record of rules and/or policies selected by the network manager regarding server selection for different types of packets (e.g., "hot" packets, "cold" packets, etc.); a table of IP address look-ups; a current connection table (for maintaining a record of all current virtual circuits for wire speed packet switching) that includes source invariants (e.g., URL, port address, and other determined fields), destination invariants (e.g., URL, source socket 3-tuple, and other determined fields), session ID, persistency timestamp when the last packet from a client was received for the subject URL (for aging out entries from table that equal or exceed a predetermined age, the age being based on an statistical estimation of the likelihood that the client will return as part of the same transaction or session based on the time of last packet receipt), cookie name and value, and/or other selected invariants; and optionally a tagging table containing tags generated by the content director, and source and destination invariants. Each entry in the current connection table and/or tagging table may be indexed by one or more of source invariant, destination invariant, and/or cookie name and value.

The Cache Processor and Cache

The cache processor 208 acts as the processor interface between the IFS 200 on the one hand and the cache 212, digest generator 216, and digest store 220 on the other. The cache processor thus retrieves data requested by the IFS 200 stored in the cache 212 and/or digest store 220 that correspond to payload invariants parsed by the IFS 200 in a packet and forwarded to the cache processor 208.

The cache 212 includes the hot URL table that includes both frequently requested, or "hot" content (e.g., URLs), and less frequently requested content (e.g., URLs). The hot URL table typically includes the following fields: source invariants (e.g., URL, port address, and other associated fields such as hot content or a secondary URL corresponding or associated with the primary URL or other type of qualifier), destination invariants (e.g., URL, source socket 3-tuple, and other determined fields), cookie name and value, a timestamp indicating when an entry was last updated (for aging out entries from table that equal or exceed a predetermined age), a hit counter, optionally a tag (generated by the switch when in the tagging mode), and/or other selected invariants. Each entry in the hot URL table is typically indexed by destination invariant(s) and/or cookie name and value.

Lease terms are typically rules or policies determined by the network manager.

Lease terms can, for example, include the maximum life of the record, limitations or restrictions on access by a client of a server or server cluster, routing directions for a packet if hot, how hot the content is, priority, restrictions on access to selected content, and hit counter reset policies.

The Digest Generator and the Digest Store

The digest generator 216 receives destination invariants (e.g., URL and cookie value) from the cache processor 208 and converts the invariants into a digest. Although any digesting method can be employed, hashing is preferred. The preferred hashing algorithm is as follows:

$L=h(K)$, with $0<$ or $L<=M$, for all keys K where K is a portion or all of a selected URL or URL identifier, h is the hash function which uses message digest or MD "fingerprint" K as the input argument, L is the location of K in the hot URL table, and M is the size of the hot URL table.

The selection of h should be fast in computation and minimize collisions. A collision occurs when a different key K' computes to the same L. When a collision happens, an alternate location from the bottom of the hot URL table is found and linked from the home location. A circular linked list is used to chain all MD "fingerprints" with the same hashed value. A head tag at the home location indicates the head of the circular list. When a new record is found, a record in an alternate location occupies its home location; the alternate location record has to be displaced. Deletion of a record in the home location will cause relocation of another record in the collision chain. As will be appreciated, other hashing functions can be employed depending upon the application.

Figure 3:
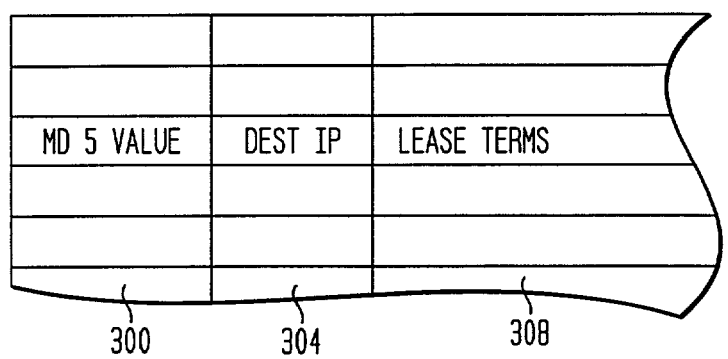
FIG. 3 depicts data structures of data objects in the data store according to an embodiment of the present invention.

The digest records, as held by the digest store, are generally of the form shown in FIG. 3. As replicated, a cache identifier 300 (which is the same as a hash value and is shown as MD 5 Value) is added to the digest records so that subsequent digest look-ups also produce an identification of the particular local object cache that may contain a requested object. The record further includes destination IP 304 which refers to the destination IP address of the server, lease terms 308, hit or access counter, a timestamp (not shown) indicating when an entry was last updated (for aging out entries from table that equal or exceed a predetermined age), and/or other selected invariants.

When a request for a URL object is received, the content director 100 uses the cache digests 300 from its peers to find out which of its peers have the desired object and to retrieve the object from the director's peer without sending queries to all neighbors. Based on the above, it is apparent that a cache digest 300 is a summary of the cached contents, in a compact format, or an indication of whether or not a particular URL is in the cache. Stated another way, the cache digest 300 is a pointer to a specific location in the memory of the cache 212 where a one or more objects corresponding to the hash is located.

Operation of the Content Director for Incoming Packets

The operation of the content director will be discussed with reference to FIGS. 1–7.

Figure 4:
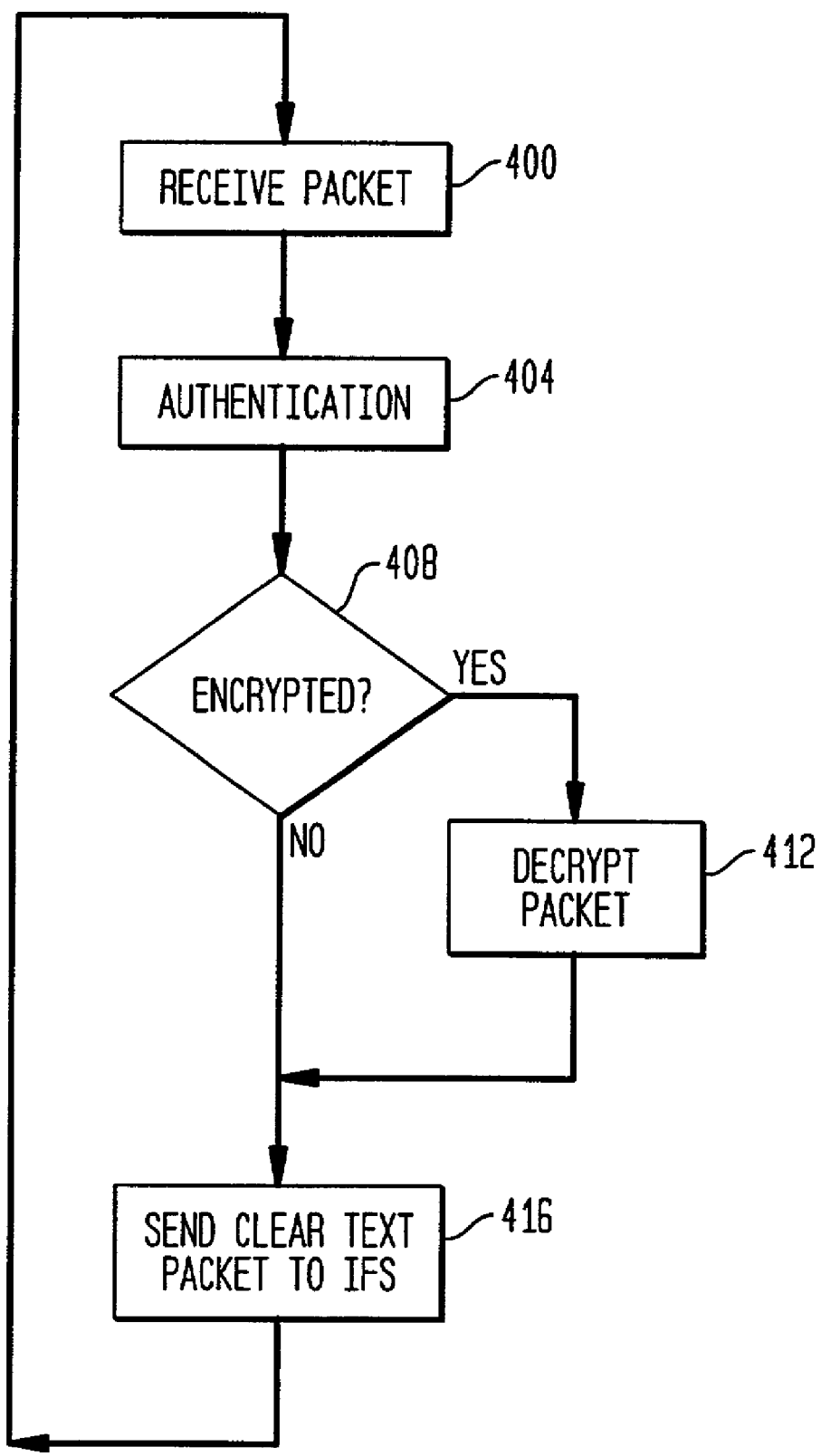
FIG. 4 is a flow chart of the operation of the SSL processor according to an embodiment of the present invention.

Referring to FIG. 4, an incoming packet (that has been load balanced by a traffic manager 120 (FIG. 1)) is received in step 400 by the SSL processor 204 (FIG. 2). The SSL processor 204 in step 404 first performs security association and authentication by known techniques to verify the identity of the client and/or the client's eligibility to access the website. This is typically performed by digital certificate authentication.

In step 408, the SSL processor 204 determines whether the packet is encrypted. If so, the processor 204 decrypts the packet in step 412 by known techniques to convert the cipher text into plain text. In step 416, the plain text packet is sent to the IFS 200 (FIG. 2) for further processing. The SSL processor 204 then returns to step 400 to process the next packet.

Figure 5:
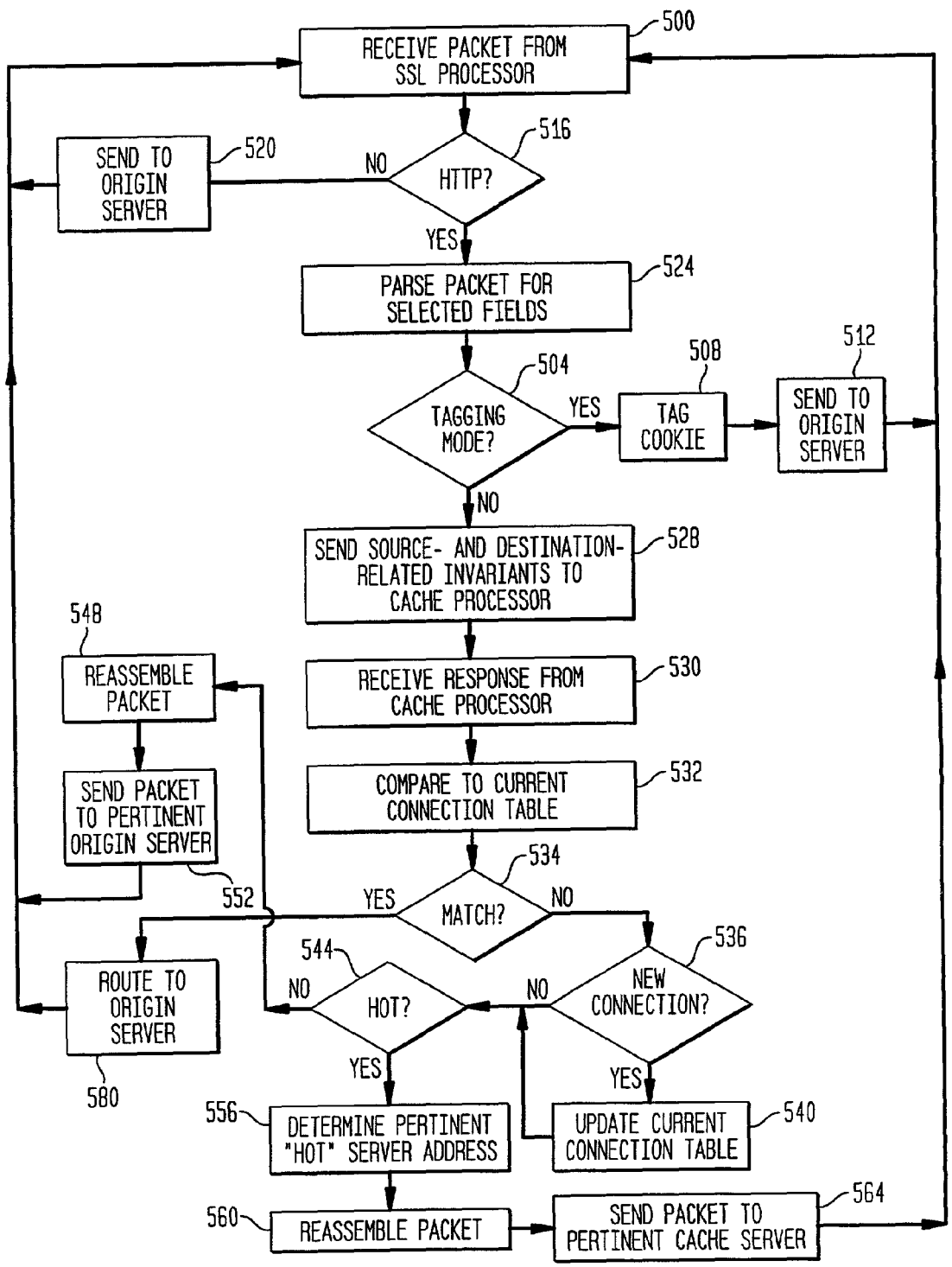
FIG. 5 is a flow chart of the operation of the IFS according to an embodiment of the present invention.

Referring to FIG. 5, the packet is received by the IFS 200 in step 500.

The IFS in step 516 determines whether the packet is in HTTP. If not, the IFS sends the packet to the origin server in step 520 and returns to step 500.

If the packet is in HTTP, the IFS parses the packet in step 524 for selected fields, e.g., destination invariants such as the URL and cookie (if one is present), source invariants, and/or other payload invariants. In a persistent HTTP connection, the client may send multiple requests and the same number of responses are returned from the server in the order of requests in a single connection. The IFS scans each request for its cookie and makes the server association based on the cookie persistence. The IFS must therefore break up the single multiple request to multiple single requests and send them each to properly selected servers based on the embedded cookie in each of the requests. The IFS must also keep track of the responses from the servers and return them to the client in the same order of the requests.

In step 504 if the content director 100 is in the tagging mode the content director 100 proceeds to step 508 to generate a tag (if a tag is not already present in the packet). Based on the destination invariants, the content director 100 generates the tag and concatenates the tag onto the cookie. When the response is provided to the client, the cookie and appended tag are saved by the browser to the client's memory. When a further request is provided by the client, the cookie and appended tag are included in the packet request payload. The content director 100 parses for the cookie, identifies the tag, and directs the packet directly to the server associated with the tag. If the packet has no cookie because the client has not yet visited the server farm, the tag is generated and concatenated onto the cookie when the response is received by the content director 100 from the server farm. If multiple cookies satisfying the criteria of domain, path, and max-age selections are returned in a request, the cookie with the most restrictive path attributes is used to determine the server persistence. The packet is then forwarded to the origin server in step 512 and the IFS returns to step 500 to await the next packet.

In one configuration, the tag is generated based on the cache or origin server serving the URL in the transaction request. Each server is assigned a unique server identifier (which can be alphabetical, numerical, or alphanumerical). The IFS determines the unique server identifier corresponding to the subject server and appends the identifier to another tag in the packet, such as the cookie generated by the server. The bit size of the tag is generally much smaller than that of the cookie. In one configuration, the tag is only generated and appended to the cookie when a previous response to forwarded by the server to the client (or when the outbound flow from the servers passes through the switch).

The content director can operate in one or more modes. In one configuration, the content director operates only in the tagging mode. In another configuration, the content director operates only in a digesting mode. In the digesting mode, digests are generated, content hotness is monitored, and transaction requests are routed to servers based on hotness and/or cookie. In another configuration, the content director operates in both modes simultaneously. In other words, the initial client/server pairing for a transaction is based on the hotness of the requested content. Later transaction requests from the same client include a server tag associated with the respective server initially assigned to the client and are routed directly to the respective server.

In switch cluster, the tags generated by one switch are provided to the other switches in the cluster to provide more efficient switch cluster operation, as another switch in the cluster can receive the subsequent transaction request containing the embedded tag.

If the content director is not in the tagging mode, the IFS in step 528 forwards the fields to the cache processor 208.

Figure 6:
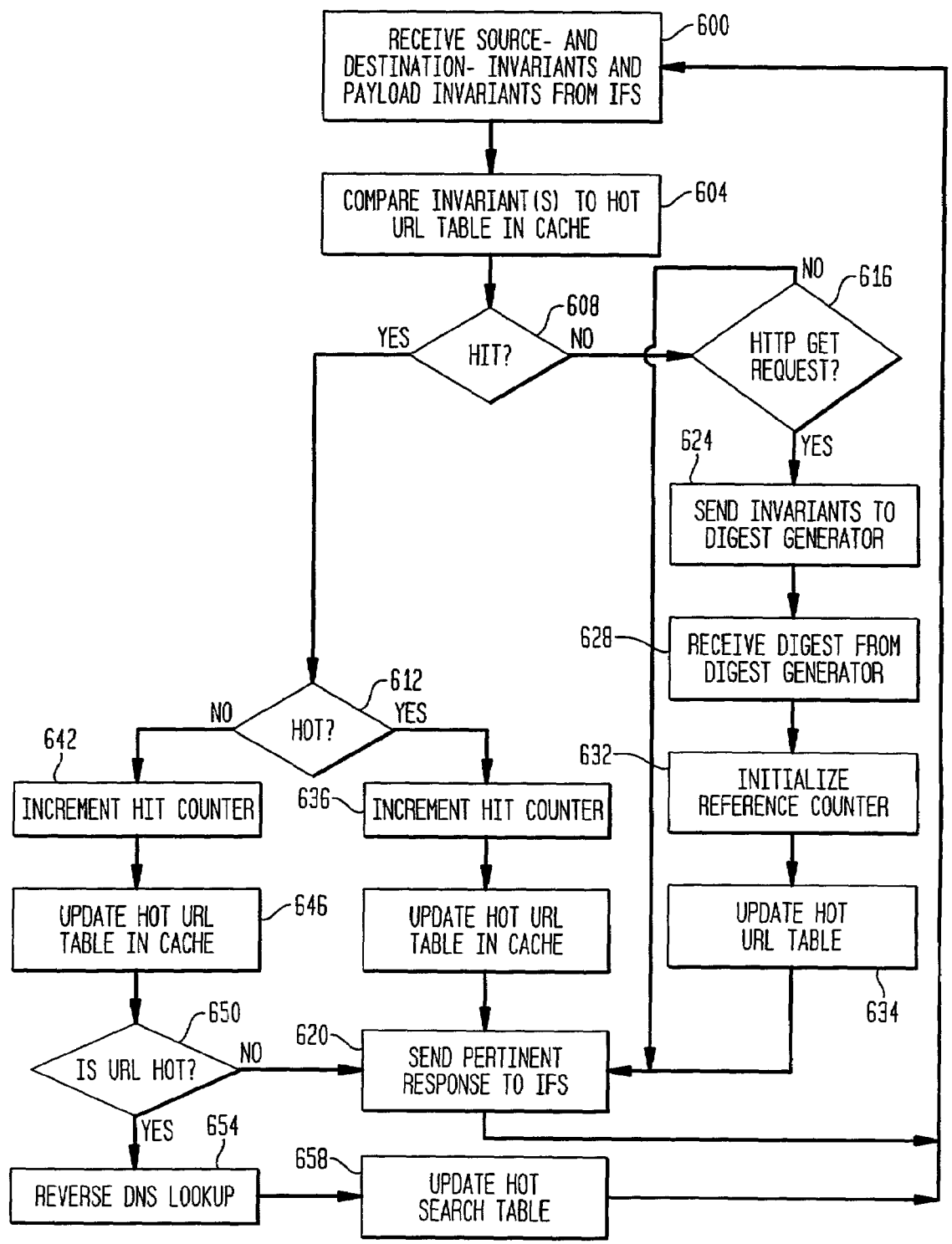
FIG. 6 is a flow chart of the operation of the cache processor according to an embodiment of the present invention.

Referring now to FIG. 6, the cache processor in step 600 receives the destination, source, and/or other payload invariants from the IFS. The cache processor 208 in step 604 compares the invariants to the hot URL table in the cache 212 to determine in step 608 whether the content has been previously requested within a predetermined period of time (the persistency period) and if so in step 612 whether the content is hot. In one configuration, the cache processor compares the name of the cookie and its value with those listed in the table and, if a match is found, the path is compared to the URL for a head match. A destination server is determined by the match entry.

If the content has not been previously requested within the persistency period, the cache processor 208 determines in step 616 if the packet is an "HTTP GET" request. If not, the cache processor 208 proceeds to step 620 (discussed below). If so, the cache processor 208 sends the invariant(s) to the digest generator 216 in step 624.

Figure 7:
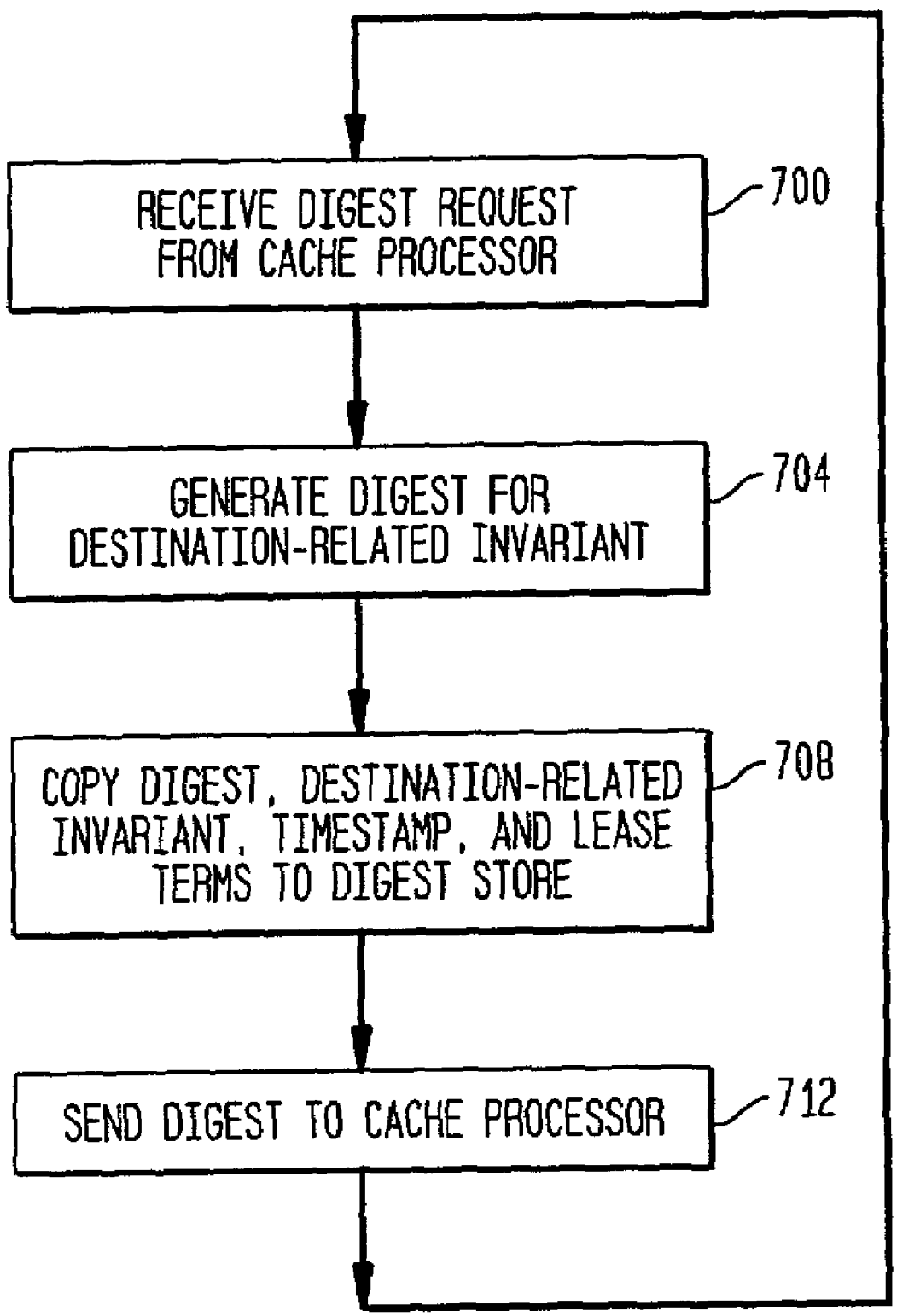
FIG. 7 is a flow chart of the operation of the digest generator according to an embodiment of the present invention.

Referring to FIG. 7, the digest generator 216 receives the digest request from the cache processor in step 700. The digest generator in step 704 generates the digest for the destination-related invariant(s), in step 708 copies the digest, timestamp, destination-related invariant, and lease terms (the digest generator determines the lease terms based upon rules/policies in the digest store) to the digest store 220, and in step 712 sends the digest, timestamp, and lease terms to the cache processor 208. The digest generator then returns to step 700.

Returning again to FIG. 6, the cache processor in step 628 receives the digest, timestamp, and lease terms from the digest generator 216 and in step 632 initializes a reference counter. The cache processor 208 updates in step 634 the hot URL table and proceeds to step 620 (discussed below).

If the packet information is in the hot URL table in step 608, the cache processor next determines whether the content requested by the packet is hot in step 612. The URL of the packet is hot if the hit counter is at or above a predetermined level, namely the hot URL threshold. If the URL is hot, the hit counter is incremented and the timestamp updated in step 636, and the hot URL table is updated accordingly in step 638. The cache processor 208 then sends the pertinent response to the IFS in step 620 (discussed below). If the URL is not hot, the hit counter is incremented and timestamp updated in step 642, and the hot URL table updated in step 646. In step 650, the cache processor again determines if the URL meets or exceeds the hot URL threshold (in light of the counter being incremented). If not, the cache processor proceeds to step 620 (discussed below). If so, the cache processor in step 654 performs a reverse domain name service or DNS look-up to discover all IP addresses that are serving the particular domain that served the hot URL page. In step 658, these addresses are written into the hot URL table. The cache processor then proceeds to step 620.

In step 620, the cache processor 208 sends the pertinent response to the IFS. If the content requested by the packet is hot, the cache processor sends a message to the IFS indicating that the content is hot and providing a list of IP addresses that are serving the particular URL in the packet, and provides any pertinent lease terms. In one configuration, the cache processor also informs the IFS of the degree of hotness, e.g., the value of the hit counter. If the content requested by the packet is not hot, the cache processor sends a message to the IFS indicating that the content is not hot and provides any pertinent lease terms.

Referring again to FIG. 5, the IFS 200 receives the response from the cache processor 208 in step 530. Next in step 532, the IFS 200 compares the parsed fields in the payload (e.g., source IP, destination IP, and source socket 3-tuple) to those listed in the current connection table. If there is no match in step 534, the IFS 200 must determine if there is a new connection in step 536 (or whether the packet is part of an existing virtual circuit). This is performed by determining by examining the header flags (SYN) in the first packet that the IFS received for the connection. If the SYN flag is not set, the packet is assumed not to belong to an existing virtual circuit, and, if the SYN flag is set, the packet is assumed to belong to a virtual circuit established between the client and an origin server before the server became hot. If the connection is new, the current connection table is updated in step 540 by adding a new entry that includes at least the source IP, destination IP, and source socket 3-tuple of the packet payload.

Whether the connection is new or old, the IFS next determines whether the URL in the packet payload is hot in step 544. If the URL is not hot, the IFS proceeds to step 548. In step 548, the IFS reassembles the packet and in step 552 sends the packet to the origin server. The IFS then returns to step 500 to process the next packet.

If the packet payload is hot in step 544, the IFS determines the pertinent hot or cache server address in step 556. This is done by examining the list of hot IP addresses and lease terms received from the cache processor 208, the queues corresponding to each of the IP addresses (to determine which cache server has the shortest queue), and/or the rules/policies in the memory of the IFS. In step 560, the packet is reassembled with the pertinent IP address and in step 564 sent to the pertinent cache server. In one configuration, the IFS uses Cache Array Routine Protocol (CARP) to divide cacheable URL objects among the cache servers. The highest value of hashing computations of cache proxy member identities and the requested URL provide a deterministic routing resolution path. Only a minimal reassignment of URL cache locations is required because URLs are directed to the cache proxy with the highest hashing score.

The IFS then repeats step 500 for the next packet to be received.

Returning again to step 534, if there is a current connection or existing virtual circuit, the packet is forwarded to the origin server in step 580 and the IFS returns to step 500.

After content becomes hot, one or more cache servers establish a connection with the origin server containing the content. The cache server(s) obtain a copy of the URL from the origin server and commence serving the URL from its/their own cache.

Figure 8:
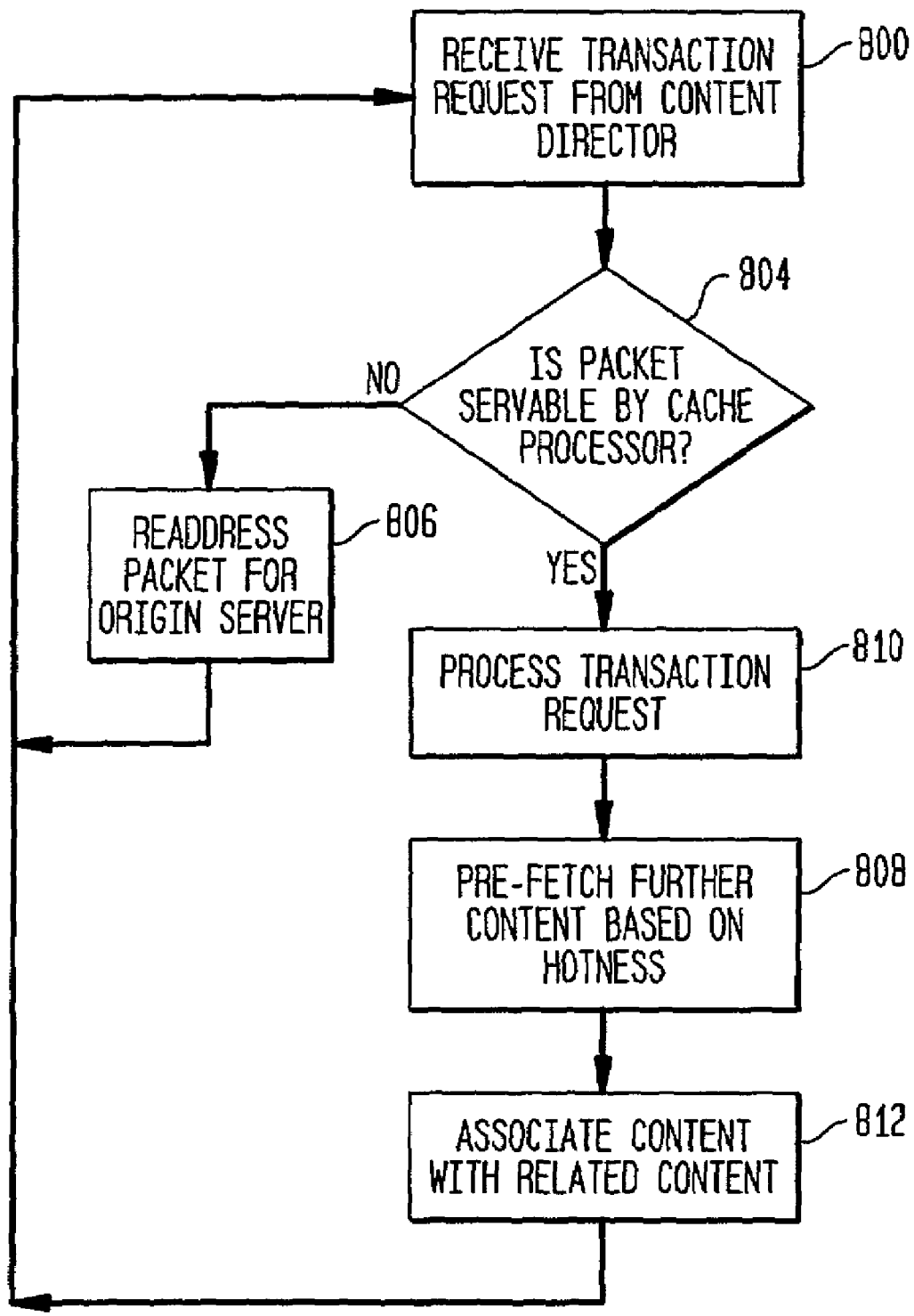
FIG. 8 is a flow chart of the operation of the cache server upon receipt of a transaction request from the network switch according to an embodiment of the present invention.

The operation of the cache servers will now be discussed with reference to FIG. 8. In step 800, the cache server receives the transaction request from the content director. In step 804, the receiving cache server must determine whether it can serve the packet. The server cannot serve the packet when the cache server has not yet cached the particular URL in the packet when initially received, the packet request method is not an HTTP GET request, and/or the request is not a cacheable type of request. If the cache server cannot serve the packet, the cache server in step 806 readdresses the packet and sends the packet to the origin server.

If the cache server can serve the packet, the cache server in step 810 processes the packet. The cache server readdresses the packet and redirects the packet to the origin server over a new or existing connection. The origin server returns the URL to the cache server (if the URL is cacheable). The cache server saves a copy of the URL and returns another copy to the client.

The cache server in step 808 pre-fetches further content (or sub-URLs) or pipelines based on the hotness of the sub-URLs referenced in the content corresponding to the URL in the present transaction request. By way of example, if two sub-URLs are referenced in the content and each sub-URL has a different degree of hotness (a different number of hits in its corresponding hit counter), the cache server assumes that the sub-URL with the greatest number of hits will be the next URL requested by the client. The cache server can retrieve the content corresponding to the URL (or the URL itself) before the next transaction request is received from the client. The time required to process the later request will thereby be greatly shortened.

In step 812, the cache server can store the content to be cached in location(s) that provide the most efficient server farm operation. For example, in a geographically distributed server cluster what content is hot can vary by geographical region or location. For example a selected content can have a first level of hotness in a first region and a second, different level of hotness in a second, different region. The content can therefore be cached in the region in which the content is hottest. In this manner, a cache server in the first region would have different cached content from a cache server in the second region. Alternatively, the hot content can be stored as part of the same server cluster where associated hot content is stored. In other words, if selected content is hot any content associated with that content (whether or not hot) is copied and stored in the same cache server cluster with the hot content. In another configuration, the URL's associated with a hot URL can be linked by known techniques to the hot URL. In another configuration, server clusters are tiered such that certain server clusters store information of a first degree of hotness (or higher) and a second, different set of server clusters store information a second degree of hotness (that is less than the first degree of hotness) and hotter content (but not as hot as the first degree of hotness). In another configuration, content associated with hot content (even if the associated content is not hot) is stored in close proximity to the hot content (such as in the same cache server or cache server cluster).

In one configuration, the position of content in a cache server is based upon the degree of hotness of the content. In other words, as content becomes hotter, the content is moved to a more accessible or higher position in the cache server such that the first and most accessible item in the cache server has the most frequent (and therefore highest number) of hits and the least accessible or lowest item in the cache has the least frequent (or fewest number) of hits. Thus, the content director 100 can instruct the various cache servers to reposition or relocate the memory addresses of content based upon the fluctuating degrees of hotness of the content over time. In other words, at a first time the content director may instruct a cache server to move a first content to a first position in the stack of content in the server and at a second time instruct the cache server to move the first item to a second, lower or higher, position in the stack, wherein the frequency of hits of the content at the first and second times is different.

As will be appreciated, cache servers either periodically check or revalidate on-demand the freshness of the cache contents. Cache servers instigate an expiration timer on each cacheable object based on the object's popularity and maximal age and last-modified time bestowed by content servers.

Referring again to FIG. 1, multiple content directors 100a–n form a cluster to increase redundancy and performance by sharing the knowledge of server application established invariant (e.g., digest, tag, and cookie). The shared information is distributed among all cluster members as shown by link 136. No one node is a single point of failure. At cluster transition of addition or deletion of a content director, only a fraction of shared information needs to be redistributed.

As will be appreciated, accessing information deep in the application layer content directors afford the opportunities to enforce certain pre-defined traffic policies and class of services. The content director can learn flow patterns of the server farm to facility by delivering of services adapted to the flash changes of demands and authenticate users for service differentiation. It can perform flow filtering, classification, learning, priority shaping, and forwarding. With content awareness, it can separate cacheable from non-cacheable URL requests directing to servers that may be better able to handle requests, or may even serve requests from its own cache.

Operation of the Content Director for Outgoing Packets

Figure 9:
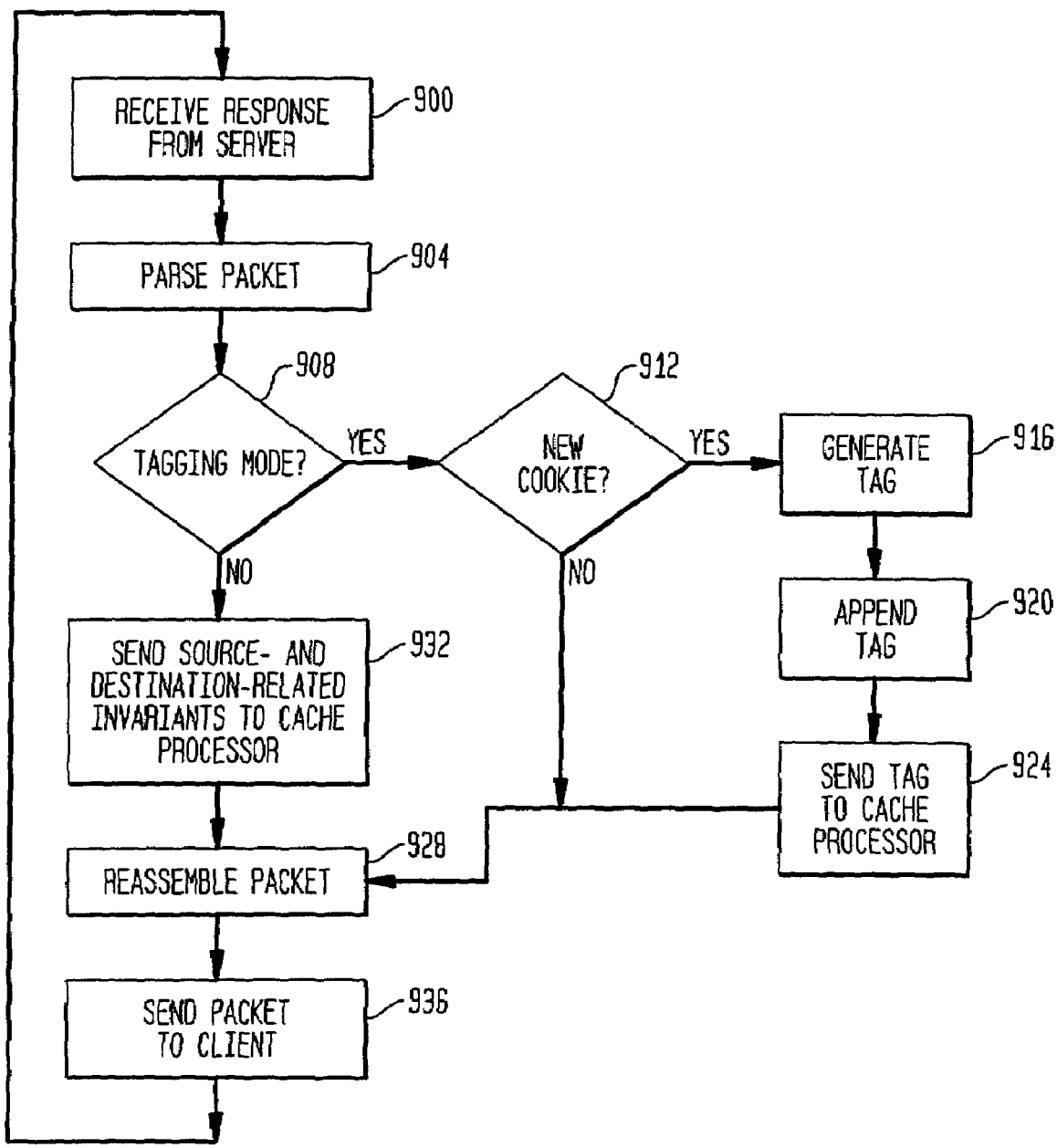
FIG. 9 is a flow chart of the operation of the intelligent flow switch upon receipt of a response according to an embodiment of the present invention.

Referring now to FIG. 9, the operation of the IFS on outbound packet flows will now be discussed. In step 900, the IFS receives the response from the respective server. The IFS receives all outgoing packets or HTTP responses. In step 904, the IFS parses the selected fields (typically the same fields are parsed as for an incoming packet). In step 908, the IFS determines if the content director is in the tagging mode (discussed above). If the content director is in the tagging mode, the IFS in step 912 determines if the cookie in the packet is a new cookie. If so, the IFS generates the tag in step 916, appends the tag to the cookie in step 920, and sends the tag to the cache processor in step 924. The IFS then proceeds to step 928 (discussed below). If the cookie is not new, the IFS assumes that the cookie already includes a tag and proceeds to step 928 (discussed below). If the content director is not in the tagging mode, the IFS in step 932 sends the source-and destination-related invariants to the cache processor. The cache processor determines if the parsed fields are in the hot URL table and, if not, forwards the fields to the digest generator. The digest generator generates a digest and creates a record in the digest store. The digest is returned to the cache processor, which creates a record in the URL table at the location corresponding to the digest. The IFS then reassembles the packet in step 928 and sends the packet to the client in step 936 via the SSL processor.

While the invention is specifically described with reference to a software-based implementation, it is to be understood that the invention may be embodied as a hardware-based device (such as an application specific integrated circuit or ASIC) or a combination of a hardware- and software-based devices.

While the invention is described with reference to the Internet, it is to be understood that the invention can be employed on other network topologies, whether the network is circuit-or packet-switched, is connectionless or connection-oriented, is synchronous or asynchronous, uses serial or parallel transmission, and/or uses a client/server or peer-to-peer architecture, and/or other network applications. Another application invariant besides a cookie or URL may be used to determine hotness or tagging.

A number of variations and modifications of the invention can be used. It would be possible to provide for some features of the invention without providing others. For example in one alternative embodiment, the content director also parses responses from the servers to the clients for payload information (e.g., source IP, destination IP, cookie name and value, etc.). This information can be added to one or more of the current connection table and hot URL table. This embodiment has the advantage of providing more comprehensive information regarding traffic flows into and out of the server farm.

In another embodiment, a pipelined connection with keep-alive scheme can be maintained between the cache servers and content servers to reuse pre-opened connection and help to speed the delivery of non-cached contents. Content pipelining may even open parallel connections to the content servers to concurrently download all the objects embedded within a page, overcoming latencies caused by the Web's back-and-forth loading process. Many web pages have embedded references. While the anchor page is being painted, the browser makes new requests to retrieve the embedded references. An intelligent cache processor can scan the returned content to pre-fetch the embedded objects in anticipation of subsequent requests.

In yet another alternative embodiment, the content director separates static content servers from the dynamic content servers in the farm based on the requesting URL and content type. Revalidation needs only to be sent to static content servers. The content director can be informed on the policy of contents updating and can purge these objects at the time they are updated. Servers can automatically or manually push content updates to the content director.

In yet a further embodiment, the content director can allow the policy rules to be configured that specify an action (load/direct/cache) for any request matching some or all of the source IP address, URL, content type or cookie. A "load" rule can be used to direct all requests for certain contents to the best able server based on the load condition at the moment. A "direct" rule will direct the requests of other contents to specified servers and a "cache" rule" will allow the content director to serve the contents from a cache proxy.

In yet a further embodiment, Squid Web Proxy Cache is used by the content director. The Squid code uses Non-blocking I/O for socket and file read/writes to avoid process creation and synchronization overhead. The content director scans Cookie and Set Cookie MIME headers, saving all cookies in a database and maintaining cookie policies. All other cache functions are removed from the code. Squid uses underlying file system to save cached objects.

In yet a further embodiment, the URL can be hashed to a storage list in memory and mapped to disk storage of a fixed size to bypass the file system.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An arrangement for serving information requests, comprising:
 a plurality of information servers connected to a communications network, all of the information servers having a common address on the communications network and serving a set of information to clients, each of the information servers being configured to receive a transaction request associated with an individual transaction and to provide a response to each transaction request; and
 a content director connecting the information servers to the communications network and distributing transaction requests among the information servers comprising:
  a flow switch that selects an appropriate information server to service each transaction request and thereafter forwards at least portions of the transaction request to a selected one of the information servers;
  a cache processor that accesses a cache;
  the cache that stores, in a hot locator table identifying information frequently requested from the information servers and including, for each locator identifying corresponding information, a hit counter indicating a number of direct transaction requests, received by the plurality of servers over a determined time interval, requesting the corresponding information;
  a digest generator that generates, when the hit counter for a locator indicates at least a threshold transaction request receipt frequency but not when the hit counter fails to indicate at least a threshold transaction receipt frequency, a digest value pointing to the location in the hot locator table where the corresponding entry is stored; and
  a digest store that stores the digests corresponding to frequently requested content.

2. The arrangement of claim 1, wherein the flow switch parses plain text transaction requests to locate selected fields and wherein the content director further comprises:
 a cryptographic module that decrypts, prior to parsing and information server selection by the flow switch, cipher text transaction requests and provides plain text transaction requests to the flow switch, wherein, prior to decryption, the cipher text transaction requests have not been routed by another flow switch.

3. The arrangement of claim 2, wherein, first and second encrypted transaction requests are received from different clients having a common electronic address and served substantially simultaneously by different information servers, wherein at least some of the responses include a cookie, wherein the cookie is generated by the information server previously assigned by the flow switch to service transaction requests from the client, and wherein the flow switch uses at least one of an locator, a cookie, and a tag in the parsed plain text equivalent of each transaction request to select an appropriate information server to service each of the first and second transaction requests.

4. The arrangement of claim 1, wherein each in the hot table further has a corresponding timestamp indicating when the respective entry was last updated, and a tag identifying a corresponding information server providing the corresponding information.

5. The arrangement of claim 1, wherein the digest store includes a digest value for each frequently requested.

6. The arrangement of claim 5, wherein, when the hit counter for an indicates at least a threshold transaction request receipt frequency, the information corresponding to the locator is served by a cache information server and not an origin information server.

7. The arrangement of claim 6, wherein, when the hit counter for a locator falls below a threshold transaction request receipt frequency, the information corresponding to the locator is served by an origin information server and not a cache information server.

8. The arrangement of claim 1, wherein the digest value is determined according to the following equation:
 L=h(K), where $0 \leq L \leq M$ for all keys K, where K is at least a portion of the locator, h is the hash function, L is the location of K in the hot locator table, and M is the size of the hot locator table.

9. The arrangement of claim 1, further comprising:
 at least one traffic manager located between the content director and one or more clients to effect load balancing across a plurality of content directors.

10. The arrangement of claim 1, wherein the content director includes a current connection table listing active connections between servers and clients, the current connection table comprising, for a selected locator, a session identifier identifying a session with a client, a persistency timestamp indicating when a last transaction request was received from the respective client for the selected locator, and cookie name and value.

11. The arrangement of claim 1, wherein the flow switch is operable to tag a transaction response, the tag identifying an information server generating the transaction response.

12. The arrangement of claim 11, wherein at least some of the responses include a cookie, wherein the cookie was previously generated by the information server previously assigned by the flow switch to service transaction requests from the client, and wherein the cookie is different from the tag.

13. The arrangement of claim 12, wherein the tag is concatenated to the cookie.

14. The arrangement of claim 13, wherein, during a first time interval, the flow switch is in a tagging mode in which the switch generates and appends tags to transaction responses and, during a second different time interval, the switch operates in a digesting mode in which digests are generated, locator hotness is monitored, and transaction requests are routed to information servers based on requested locator hotness and/or cookie, wherein, in the tagging mode, locator hotness is not monitored, and wherein, in the digesting mode, tags are not generated and appended to transaction responses.

15. In an arrangement comprising a plurality of information servers connected to a communications network, each of the information servers having a common address on the communication network, serving a set of information to clients, and being configured to receive a transaction request associated with an individual transaction and to provide a response to each transaction request, a method for serving transaction requests from clients comprising:

providing a content director connecting the information servers to the communications network and comprising at least one flow switch selecting an appropriate information server to service each transaction request and thereafter forward at least portions of the transaction request to a selected one of the information servers;

maintaining a hot locator table in a cache store of the content director, identifying information frequently requested from the information servers, the hot locator table including, for each locator identifying corresponding information, a hit counter indicating a number of direct transaction requests, received by the plurality of information servers over a determined time interval, requesting the corresponding information;

generating by a digest generator, when the hit counter for a selected locator indicates at least a threshold transaction request receipt frequency but not when the hit counter fails to indicate at least a threshold receipt frequency, a digest value pointing to the location in the hot table where the entry corresponding to the selected locator is stored; and accessing a digest store comprising the digest values to select an information server to service a transaction request for frequently requested information.

16. The method of claim 15, further comprising:

a cryptographic module decrypting a cipher text transaction request to provide a plain text transaction request to a first flow switch;

the first flow switch parsing the plain text transaction request to locate one or more selected fields;

the first flow switch, based on the one or more selected fields, selecting an appropriate information server to service the transaction request; and the first flow switch thereafter forwarding at least portions of the plain text transaction request to a selected one of the information servers, wherein the cipher text transaction request is decrypted prior to the parsing and selecting steps and wherein, prior to the decrypting step, the cipher text transaction request has not been directed to a flow switch other than the first flow switch.

17. The method of claim 16, further comprising:

receiving first and second encrypted transaction requests from different clients having a common electronic address, the requests being served substantially simultaneously by different information servers, wherein at least some of the responses include a cookie, wherein the cookie is generated by the information server previously assigned by the first flow switch to service transaction requests from the client, and wherein the first flow switch uses at least one of an locator, a cookie, and a tag in the parsed plain text equivalent of each transaction request to select an appropriate information server to service each of the first and second transaction requests.

18. The method of claim 15, wherein each locator in the hot table further has a corresponding timestamp indicating when the respective entry was last updated, and a tag identifying a corresponding information server providing the corresponding information.

19. The method of claim 15, wherein a digest value is generated for each frequently requested.

20. The method of claim 19, further comprising:

when the hit counter for an indicates at least a threshold transaction request receipt frequency, directing a transaction request for information associated with the locator to a cache information server.

21. The method of claim 20, further comprising:

when the hit counter for an locator falls below a threshold transaction request receipt frequency, directing a transaction request for information associated with the locator to an origin information server.

22. The method of claim 15, wherein the digest value is determined according to the following equation:

L=h(K), where $0 \leq L \leq M$, for all keys K, where K is at least a portion of the locator, h is the hash function, L is the location of K in the hot locator table, and M is the size of the hot locator table.

23. The method of claim 15, wherein at least one traffic manager is located between the content director and one or more clients to effect load balancing across a plurality of content directors.

24. The method of claim 15, further comprising:

maintaining a current connection table listing active connections between servers and clients, the current connection table comprising, for a selected locator, a session identifier identifying a session with a client, a persistency timestamp indicating when a last transaction request was received from the respective client for the selected locator, and cookie name and value.

25. The method of claim 15, further comprising:

during a first time interval, the first flow switch tagging a transaction response, the tag identifying an information server generating the transaction response.

26. The method of claim 25, wherein at least some of the responses include a cookie, wherein the cookie was previously generated by the information server previously assigned by the first flow switch to service transaction requests from the client, wherein the tag is appended to the cookie, and wherein the cookie is different from the tag.

27. The method of claim 26, wherein the tag is concatenated to the cookie.

28. The method of claim 25, further comprising:

during a second different time interval, generating a digest value for frequently requested information, the digest value indicating a location where an object associated with the frequently requested information is stored;

monitoring the frequency of transaction requests for information; and directing transaction requests to information servers based on the frequency of request of information and/or a cookie included in at least some of the transaction requests, wherein, in the first time interval, locator hotness is not monitored, and wherein, in the second time interval, tags are not generated and appended to transaction responses.

29. A computer readable medium comprising processor executable instructions to perform the steps of claim 15.

30. An arrangement for serving information requests, comprising:
- a plurality of information servers connected to a communications network, all of the information servers having a common address on the communications network and serving a set of information to clients, each of the information servers being configured to receive a transaction request associated with an individual transaction and to provide a response to each transaction request; and
- content director means for connecting the information servers to the communications network and distributing transaction requests among the information servers comprising:
    - first flow switching means for parsing plain text transaction requests to locate selected fields, selecting an appropriate information server to service each transaction request, and thereafter forwarding at least portions of the parsed transaction requests to a selected one of the information servers;
    - cache processing means for accessing a plurality of objects in response to communications received from the first flow switching means;
    - cache means for storing, in a hot locator table, the plurality of objects including locators identifying information frequently requested from the information servers and including, for each locator identifying corresponding information, a hit counter indicating a number of direct transaction requests, received by the plurality of information servers over a determined time interval, requesting the corresponding information;
    - digest generator means for generating, when the hit counter for a locator indicates at least a threshold transaction request receipt frequency but not when the hit counter fails to indicate at least a threshold transaction receipt frequency, a digest value pointing to the location in the hot locator table where the corresponding entry is stored; and
    - digest store means for storing the digests corresponding to frequently requested content.

31. The arrangement of claim 30, wherein the content director means further comprises:
- decrypting means for decrypting, prior to parsing and information server selection by the first flow switching means, cipher text transaction requests and providing plain text transaction requests to the first flow switching means, wherein, prior to the decrypting function, the cipher text transaction request has not been directed to a flow switching means other than the first flow switching means.

32. The arrangement of claim 31, wherein, first and second encrypted transaction requests are received from different clients having a common electronic address and served substantially simultaneously by different information servers, wherein at least some of the responses include a cookie, wherein the cookie is generated by the information server previously assigned by the first flow switching means to service transaction requests from the client, and wherein the first flow switching means uses at least one of an locator, a cookie, and a tag in the parsed plain text equivalent of each transaction request to select an appropriate information server to service each of the first and second transaction requests.

33. The arrangement of claim 30, wherein, when the hit counter for a locator indicates at least a threshold transaction request receipt frequency, the information corresponding to the locator is served by a cache information server and not an origin information server and wherein, when the hit counter for an locator falls below a threshold transaction request receipt frequency, the information corresponding to the locator is served by an origin information server and not a cache information server.

34. The arrangement of claim 30, wherein the digest value is determined according to the following equation:
$L=h(K)$, where $0 \leq L \leq M$ for all keys K, where K is at least a portion of the locator, h is the hash function, L is the location of K in the hot table, and M is the size of the hot table.

35. The arrangement of claim 30, wherein the first flow switching means tags a transaction response, the tag identifying an information server generating the transaction response, wherein at least some of the responses include a cookie, wherein the cookie is generated by the information server previously assigned by the first flow switching means to service transaction requests from the client, wherein the cookie is different from the tag, and wherein the tag is concatenated to the cookie.

36. In an arrangement comprising a plurality of information servers connected to a communications network, the information servers having a common address on the communication network and serving a set of information to clients, each of the information servers being configured to receive a transaction request associated with an individual transaction and to provide a response to each transaction request, a method for serving transaction requests from clients comprising:
- providing a flow switch in a content director for parsing plain text transaction requests to locate selected fields, select an appropriate information server to service each transaction request, and forward at least portions of the parsed transaction request to a selected one of the information servers:
- maintaining a hot locator table in a cache store at the content director, identifying information frequently requested from the information servers, the hot locator table including, for each locator identifying corresponding information, a hit counter indicating a number of direct transaction requests, received by the plurality of servers over a determined time interval, requesting the corresponding information;
- qenerating, when the hit counter for a selected locator indicates at least a threshold receipt frequency but not when the hit counter fails to indicate at least a threshold receipt frequency, a digest value pointing to a location in the hot locator table where the corresponding entry is stored;
- when the hit counter for a locator indicates at least a threshold transaction request receipt frequency, locating the information associated with the locator at a cache information server and thereafter directing a transaction request for information associated with the locator to a cache information server; and
- when the hit counter for a locator falls below a threshold transaction request receipt frequency, directing a transaction request for information associated with the locator to an origin information server.

37. The method of claim 36, further comprising:
- a cryptographic module decrypting a cipher text transaction request to provide a plain text transaction request to a first flow switch;
- the first flow switch parsing the plain text transaction request to locate one or more selected fields;

the first flow switch, based on the one or more selected fields, selecting an appropriate information server to service the transaction request; and the first flow switch thereafter forwarding at least portions of the plain text transaction request to a selected one of the information servers, wherein the cipher text transaction request is decrypted prior to the parsing and selecting steps and wherein, prior to the decrypting step, the cipher text transaction request has not been directed to a flow switch other than the first flow switch.

38. The method of claim 37, further comprising:

receiving first and second encrypted transaction requests from different clients having a common electronic address, the requests being served substantially simultaneously by different information servers, wherein at least some of the responses include a cookie, wherein the cookie is generated by the information server previously assigned by the first flow switch to service transaction requests from the client, and wherein the first flow switch uses at least one of an locator, a cookie, and a tag in the parsed plain text equivalent of each transaction request to select an appropriate information server to service each of the first and second transaction requests.

39. The method of claim 37, further comprising:

accessing tile hot locator table to select an information server to service a transaction request for frequently requested information.

40. The method of claim 39, wherein a digest value is generated for each frequently requested locator.

41. The method of claim 36, wherein each locator in the hot locator table further has a corresponding timestamp indicating when the respective entry was last updated, and a tag identifying a corresponding information server providing the corresponding information.

42. The method of claim 39, wherein the digest value is determined according to the following equation:

$L=h(K)$, where $0 \leq L \leq M$ for all keys K, where K is at least a portion of the locator, h is the hash function, 1, is the location of K in the hot locator table and M is the size of the hot locator table.

43. The method of claim 36, wherein at least one traffic manager is located between the content director and one or more clients to effect load balancing across a plurality of content directors.

44. The method of claim 36, further comprising:

maintaining a current connection table listing active connections between servers and clients, the current connection table comprising, for a selected locator, a session identifier identifying a session with the respective client, a persistency timestamp indicating when a last transaction request was received from a client for the selected locator, and cookie name and value.

45. The method of claim 36, further comprising:

during a first time interval, the first flow switch tagging a transaction response, the tag identifying an information server generating the transaction response.

46. The method of claim 45, wherein at least some of the responses include a cookie, wherein the cookie is generated by the information server previously assigned by the first flow switch to service transaction requests from the client, and wherein the cookie is different from the tag.

47. The method of claim 46, wherein the tag is concatenated to the cookie.

48. The method of claim 45, further comprising:

during a second different time interval, generating a digest value for frequently requested information, the digest value indicating a location where an object associated with the frequently requested information is stored;

monitoring the frequency of transaction requests for information; and directing transaction requests to information servers based on the frequency of request of information and/or a cookie included in at least some of the transaction requests, wherein, in the first time interval, locator hotness is not monitored, and wherein, in the second time interval, tags are not generated and appended to transaction responses.

49. A computer readable medium comprising processor executable instructions to perform the steps of claim 36.

* * * * *